US00RE37726E

(19) United States
(12) Reissued Patent
Tanaka et al.

(10) Patent Number: US RE37,726 E
(45) Date of Reissued Patent: Jun. 4, 2002

(54) METHOD FOR TRANSFERRING HOT MELT INK TO A RECORDING MEDIUM

(75) Inventors: Hideshi Tanaka, Yokohama; Itsuo Takanashi, Kamakura; Shigeaki Tada, Hiratsuka; Toshinori Takahashi, Kawasaki, all of (JP)

(73) Assignee: Victor Company of Japan, Ltd., Yokohama (JP)

(21) Appl. No.: 09/694,850

(22) Filed: Oct. 20, 2000

Related U.S. Patent Documents

Reissue of:
(64) Patent No.: 5,277,501
Issued: Jan. 11, 1994
Appl. No.: 07/990,695
Filed: Dec. 15, 1992

(30) Foreign Application Priority Data

Dec. 19, 1991 (JP) ..... 2-354685

(51) Int. Cl.[7] ..... B41J 2/315
(52) U.S. Cl. ..... 400/120.18; 156/240; 346/76.1; 347/193; 347/171
(58) Field of Search ..... 400/120.01, 240.3, 400/470, 120.18, 120.13; 346/76.1, 135.1; 156/240, 230, 235, 239, 310; 283/77, 109; 347/171, 105, 193, 212; 427/265, 164

(56) References Cited

U.S. PATENT DOCUMENTS

| | | | | | |
|---|---|---|---|---|---|
| 4,503,095 | A | * | 3/1985 | Seto et al. | 427/265 |
| 4,527,171 | A | * | 7/1985 | Takanashi et al. | 347/212 |
| 4,586,834 | A | * | 5/1986 | Hachisuga et al. | 400/120.13 |
| 4,588,315 | A | * | 5/1986 | Seto et al. | 427/265 |
| 4,704,615 | A | * | 11/1987 | Tanaka | 347/212 |
| 4,724,025 | A | * | 2/1988 | Nishikawa | 156/230 |
| 4,801,473 | A | * | 1/1989 | Creagh et al. | 427/164 |
| 4,873,134 | A | * | 10/1989 | Fulton et al. | 347/105 |
| 4,914,079 | A | * | 4/1990 | Takei et al. | 156/240 |
| 5,011,570 | A | * | 4/1991 | Ohbayashi | 156/310 |
| 5,060,981 | A | * | 10/1991 | Fossum et al. | 283/109 |
| 5,120,383 | A | * | 6/1992 | Takei et al. | 156/240 |
| 5,147,489 | A | * | 9/1992 | Scrutton et al. | 156/240 |

FOREIGN PATENT DOCUMENTS

| | | | |
|---|---|---|---|
| GB | 2045688 | * 11/1980 | 156/240 |
| JP | 0046987 | * 4/1980 | 156/240 |
| JP | 0047690 | * 3/1982 | 156/240 |
| JP | 0070690 | * 5/1982 | 156/240 |
| JP | 277466 | * 12/1986 | |

* cited by examiner

*Primary Examiner*—Eugene Eickholt
(74) *Attorney, Agent, or Firm*—Anderson Kill Olick; Eugene Lieberstein; Michael N. Meller

(57) ABSTRACT

The present invention discloses a method for thermally transferring an ink pattern to a recording medium, comprising the steps of preparing an ink sheet provided with a hot-melt and/or hot-sublimable ink layer and a transparent material sheet provided with a transparent hot-melt material layer, thermally producing an ink pattern on the transparent material layer of the transparent material sheet by heating the ink sheet with thermal head, and thermally transferring the ink pattern to the recording medium together with the transparent hot-melt material layer. And an another method comprising the steps of preparing an ink sheet having a transparent hot-melt material frame layer and a hot-melt and/or hot-sublimable ink frame layer, thermally transferring the transparent hot-melt material frame layer onto a surface of a platen roller, thermally producing an ink pattern on the transparent hot-melt material frame layer on the platen roller by heating the hot-melt and/or hot-sublimable ink frame layer with a thermal head, and thermally transferring the ink pattern together with the transparent hot-melt material frame layer onto a recording medium.

2 Claims, 5 Drawing Sheets

METHOD FOR TRANSFERRING HOT MELT INK TO A RECORDING MEDIUM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to improvements of a thermal transferring printing method, and it particularly relates to a thermal transferring printing method suitable to a recording medium of which a surface has unevenness to print thereon.

2. Description of the Related Art

As is well known, a thermal transferring printing apparatus is used to print an ink pattern such as a picture or letters on a recording medium by thermally transferring hot-melt or hot-sublimable ink coated on an ink sheet to the recording medium by heating the ink sheet with a thermal head. However, it poses a problem that a recording medium having surface unevenness (rough surface) can not be employed in the apparatus because of degradation of printing quality due to an insufficient contact of the ink with the recessed portions of the unevenness of the recording medium.

As countermeasure of the insufficient contact, a hot-melt ink having high fluidity or a dot plate formed in accordance with the printing contents is employed as well as applying a large contact force with the thermal head. However, an acceptable result is not obtained yet.

In order to eliminate the above problem, there is proposed a thermal transferring printing method in "Japan Hardcopy '92", as shown in FIG. 1.

FIG. 1 is a side view showing a general construction and an operation of a thermal transfer printer in a prior art.

Referring to FIG. 1, after thermally transferring an ink pattern 101 onto a surface of a soft platen roller 103 from an ink sheet 100 with a thermal head 102, the ink pattern 101 on the platen roller 103 is printed by pressing the platen roller 103 onto a surface of a recording medium 104 having an uneven surface to be printed.

In the above method, however, when using high fluidity ink, there are problems that the ink is liable to flow out from the printed ink pattern on the recording medium when the recording medium has a smooth surface in particular, and it is difficult to superpose many colors of ink on the recording medium at the same time. In addition, a printing of a picture having gradation is also difficult.

SUMMARY OF THE INVENTION

Accordingly, a general object of the present invention is to provide methods for transferring hot-melt ink to a recording medium in which the above disadvantages have been eliminated.

A specific object of the present invention is to provide a method for thermally transferring an ink pattern to a recording medium, comprising the steps of, preparing an ink sheet provided with a hot-melt and/or hot-sublimable ink layer thereon and a transparent material sheet provided with transparent hot-melt material layer thereon, thermally producing an ink pattern on the transparent hot-melt material layer of the transparent material sheet by heating the hot-melt and/or hot-sublimate ink layer with a thermal head, and thermally transferring the ink pattern produced on the transparent hot-melt material layer to the recording medium together with the transparent hot-melt material layer.

An another specific object of the present invention is to provide a method for thermally transferring hot-melt and/or hot-sublimable ink to a recording medium, comprising the steps of, preparing an ink sheet having at least a transparent hot-melt material frame layer and a hot-melt and/or hot-sublimable ink frame layer thereon, thermally transferring the transparent hot-melt material frame layer onto a surface of a platen roller, thermally producing an ink pattern on the transferred transparent hot-melt frame layer on the platen roller by heating the transparent hot-melt and/or hot-sublimable ink frame layer with a thermal head, and thermally transferring the ink pattern produced on the transparent hot-melt material layer to the recording medium together with the transparent hot-melt frame layer.

Other objects and further features of the present invention will be apparent from the following detailed description.

DETAILED DESCRIPTION OF THE PREFERRED EMBODIMENT

Description will be given to an embodiment according to the present invention accompanying drawings.

Figure 1:
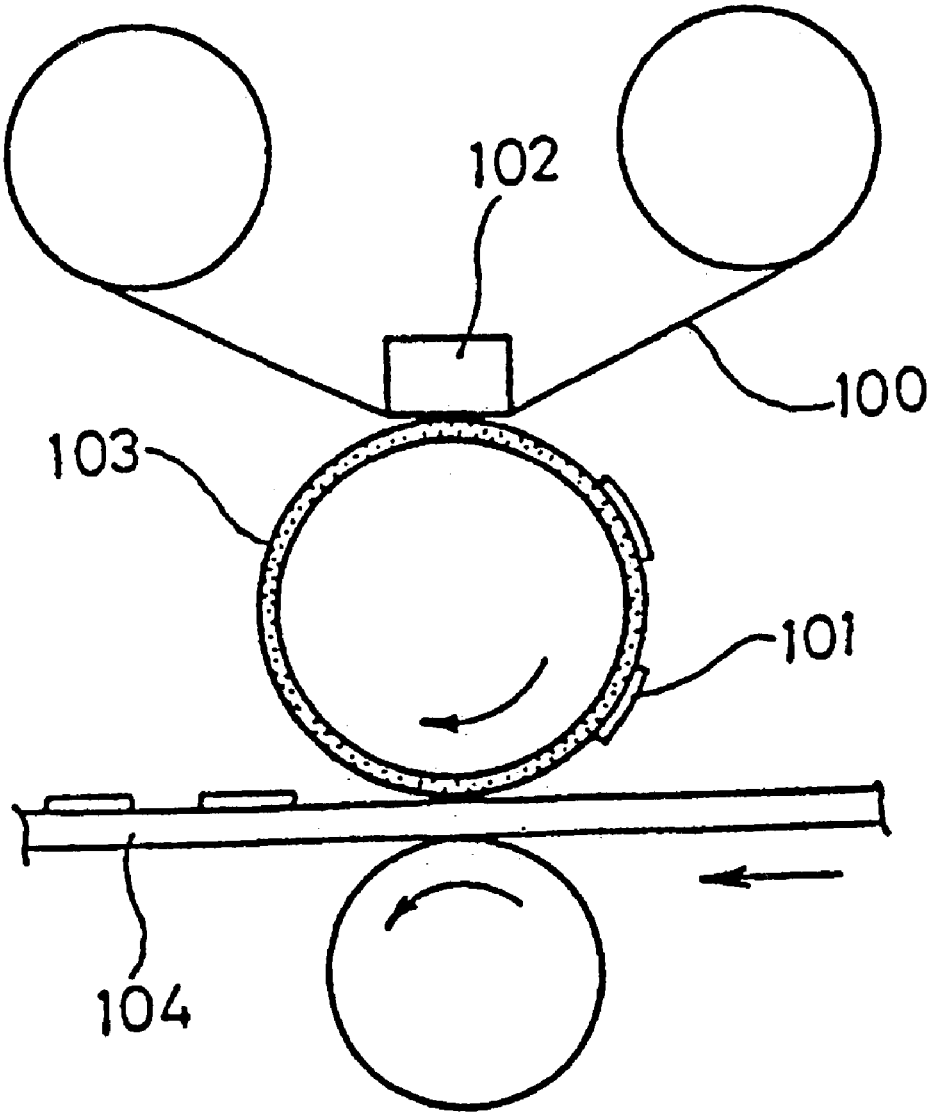
Fig.1 PRIOR ART
FIG. 1 is a side view showing a general construction and an operation of a thermal transfer printer in a prior art.
Figure 2:
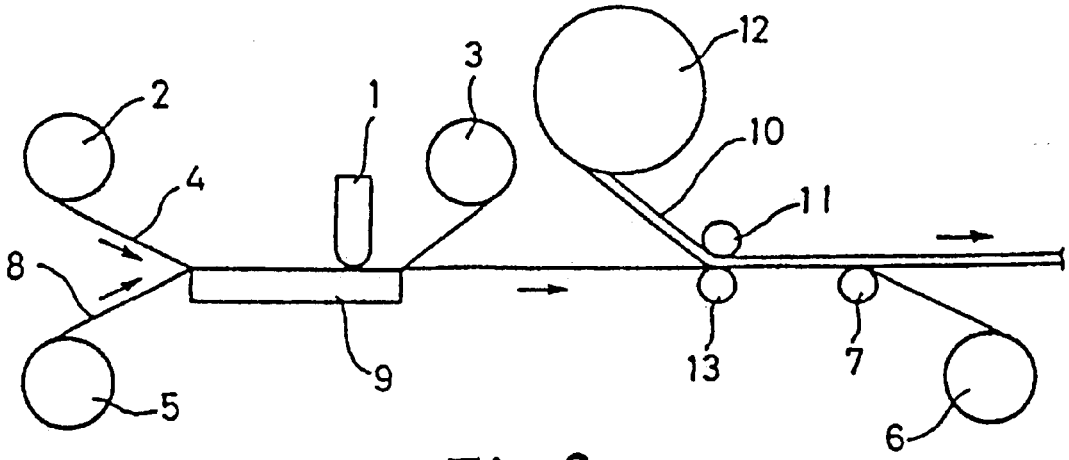
FIG. 2 is a side view showing a general construction and an operation of a thermal transfer printer of an embodiment according to the present invention.

FIG. 2 is a side view showing a general construction and an operation of a thermal transfer printer of an embodiment according to the present invention.

Referring to FIG. 2, a thermal transfer printer of the present invention generally comprises a thermal head 1, a first supply reel 2, a first take-up reel 3, an ink sheet 4 extendedly provided between the first supply and take-up reels 2, 3 through a guide roller (not shown), a second supply reel 5, a second take-up reel 6, a transparent material sheet 8 extendedly provided between the second supply and take-up reels 5, 6 through a guide roller 7, a supporting stage 9 for supporting the transparent material sheet 8, a third supply reel 12 for supplying a recording medium 10 through a guide roller 11, a heating roller 13 provided in an opposite relation with the guide roller 11.

Figure 3:
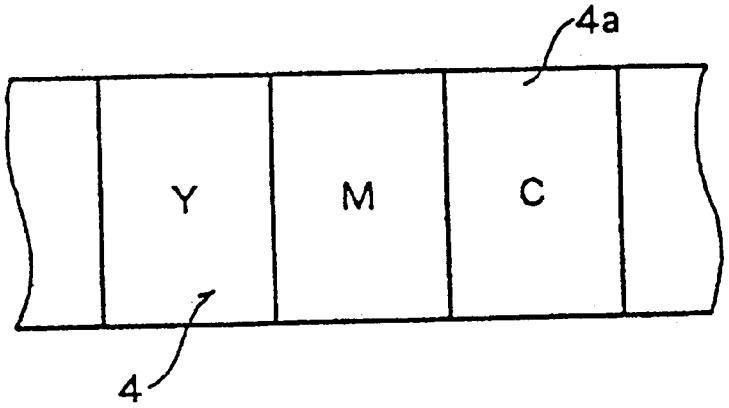
FIG. 3 is a plan view showing an ink sheet used in the present invention.

FIG. 3 is a plan view showing an ink sheet used in the present invention.

As shown in FIG. 3, the ink sheet 4 is provided with ink frame layers made of hot-melt and/or sublimable ink of at least one or more colors, for instance, yellow (Y), magenta (M) and cyan (C) at a predetermined pitch on a base sheet.

Figure 4:
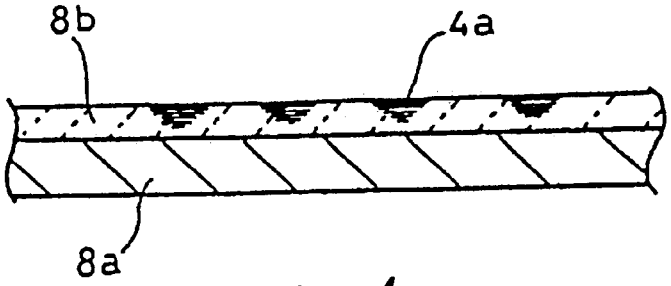
FIGS. 4 and 5 are enlarged sectional views showing the printing process of FIG. 2.
Figure 5:
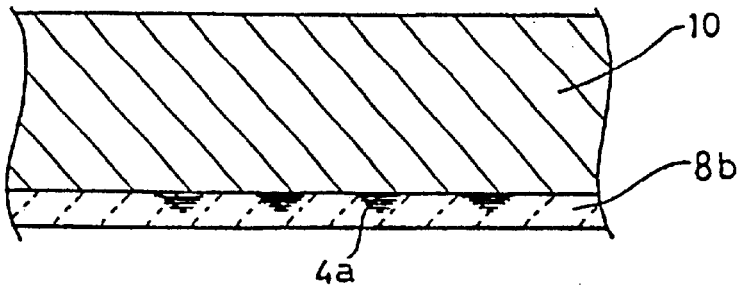

FIG. 4 and FIG. 5 are sectional views showing the printing processes of the printer shown in FIG. 2.

The transparent material sheet 8 is made by coating a hot-melt transparent material 8b on a base film 8a, for instance, made of polyester resin, as shown in FIG. 4.

For the material of the hot-melt transparent material 8b, such material as wax, for instance, paraffin wax, microcrystalline wax or carnauba wax is used as a major component and a small amount of oil, for instance, linseed oil or mineral oil is used as an additive. In order to have hot-sublimable material, cellulose-acetate-propionate resin and polyester resin may further be added to the above listed wax based material and used as the hot-melt transparent material 8*b* as well.

Next, the description is given to the method for transferring the hot-melt ink to the recording medium 10 in above thermal transferring printing apparatus referring to FIG. 4 and FIG. 5.

At first, the transparent material sheet 8 is placed stationary on the supporting stage 9 in such a manner that the layer of the transparent material 8b thereof faces upward, and the ink sheet 4 is superposed on the transparent material sheet 8 in such a manner that an ink frame 4a closely touches the transparent material 8b. Then, both of them are pressed by the thermal head 1 being heated as they are transported from an end of the supporting stage 9 to another end thereof, so that an ink pattern 4a is transferred to the transparent material 8a as shown in FIG. 4.

In order to obtain a color printing, the same operation is repeatedly performed with other color ink frames of the ink sheet 4 after taking-up the used one color ink frame of the ink sheet 4 by the first take-up reel 3 and returning the thermal head 1 to the initial position.

After a full color image is printed on the transparent material sheet 8, the transparent material sheet 8 carrying the full color image 4a is forwarded in the direction of arrow to the heating roller 13 by the second taking-up roller 6, during this movement, the transparent material sheet 8 and the recording medium 10 fed out of the third supply reel 12, are interposed together between the guide roller 11 and the heating roller 13 is heated. This causes the ink pattern 4a (full color) together with the layer of the transparent material 8b to contact closely with the recording medium 10 and to be heated together by the heating roller 13 so that the ink pattern 4a together with the layer of the transparent material 8b is thermally transferred to the recording medium 10 as shown in FIG. 5.

As mentioned in the foregoing, after the ink pattern is transferred to the surface of the transparent material sheet 8 with the thermal head 1, then the ink pattern is further transferred together with the layer of the transparent material 8b to the recording medium 10 by causing the layer of the transparent material 8b to be separated from the base film 8a and transferred on to the recording medium 10.

Thus, it will be understood that the printing quality according to the present invention is not affected by the unevenness of the surface of the recording medium 10.

Further, transparent material sheet which carries the ink pattern on the layer of the transparent material 8b, may be cut to a section of printed sheet so that such section may be used to print the carried pattern on a desired recording medium, for example, a recording medium having a predetermined configuration or a three dimensional configuration can be thermally printed by using such a cut section of printed sheet.

Next, the description is given to a further embodiment of the present invention accompanying FIGS. 6 through 11.

Figure 6:
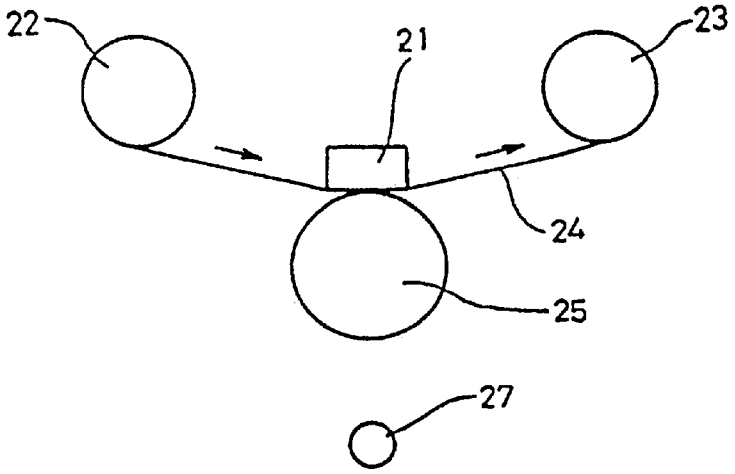
FIG. 6 and FIG. 7 are side elevations respectively showing a general construction and operations of a thermal transfer printer according to the further embodiment of the present invention.
Figure 7:
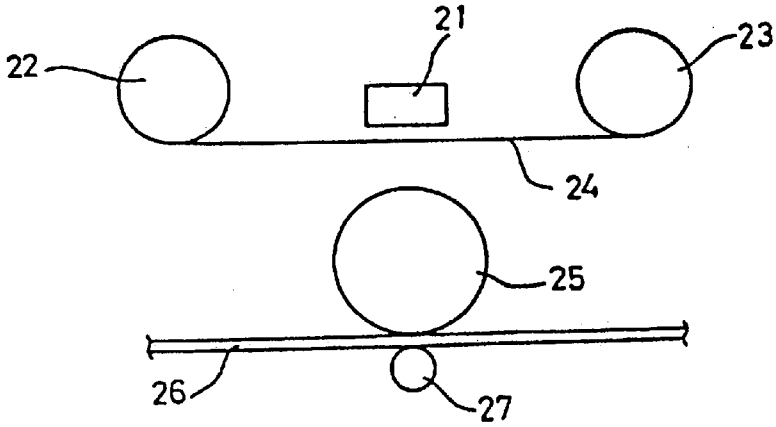

FIG. 6 and FIG. 7 are side elevations respectively showing a general construction and the operation of a thermal transfer printer according to the further embodiment of the present invention.

Referring to FIG. 6 and FIG. 7, this thermal transfer printer generally comprises a thermal head 21, a supply reel 22, a take-up reel 23, an ink sheet 24 extendedly provided between the supply and take-up reels 22, 23, a platen roller 25 having a soft and smooth surface and equipped with a heater (not shown) therein and a press roller 27 for pressing a recording medium 26 to the platen roller 25.

Figure 8:
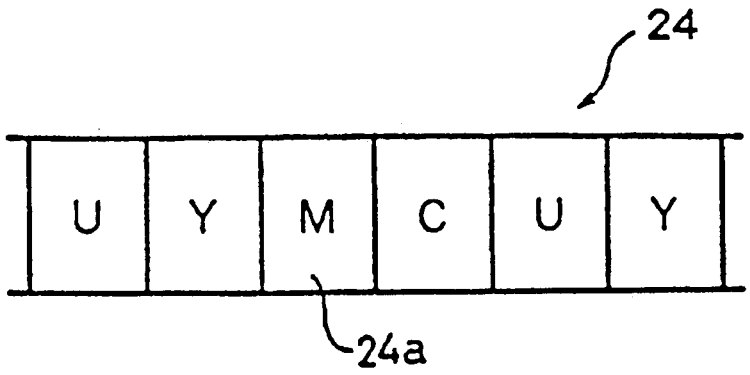
FIG. 8 is a plan view showing an ink sheet used in the further embodiment of the present invention.

FIG. 8 is a plan view showing an ink sheet used for the further embodiment of the present invention.

As shown in FIG. 8, the ink sheet 24 is provided with ink frame layers made of hot-melt and/or sublimable ink 24a of at least one or more colors, for instance, yellow (Y), magenta (M) and cyan (C), and a transparent hot-melt material frame layer U at a predetermined pitch on a base sheet, where a material of the transparent hot-melt material frame layer U is printable with the sublimable ink.

The following is the description of the method for transferring the ink to the recording medium 26 in the above thermal transferring printing apparatus.

Figure 9:
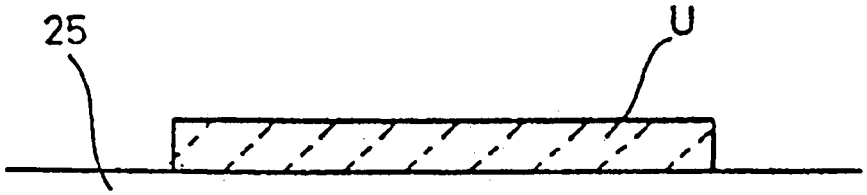
FIGS. 9 through 11 are enlarged sectional views showing the printing process of FIG. 6.
Figure 10:
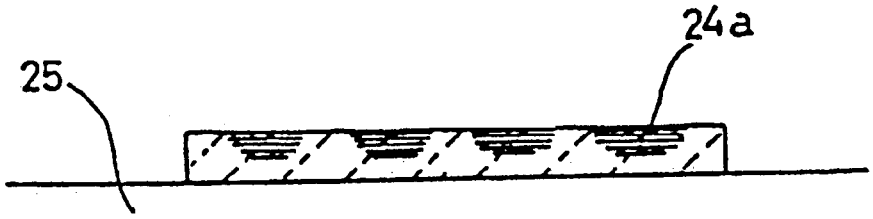

At first, the transparent material frame layer U on the ink sheet 24 is thermally transferred onto the platen roller 25 as shown in FIG. 9 by pressing the ink sheet 24 onto the platen roller 25 with the thermal head 21 as shown in FIG. 6. Then, the ink sheet 24 is fed in an arrow direction, and an ink pattern made of hot-melt and/or sublimable ink 24a is thermally transferred onto the transparent material frame layer U previously transferred on the platen roller 25 as shown in FIG. 10. After that, as shown in FIG. 7, the ink pattern together with the transparent frame U is thermally transferred onto a recording medium 26 by being closely contacted, heated and depressed to the recording medium 26 by the heater in the platen roller 25 and the press roller 27 respectively.

Figure 11:
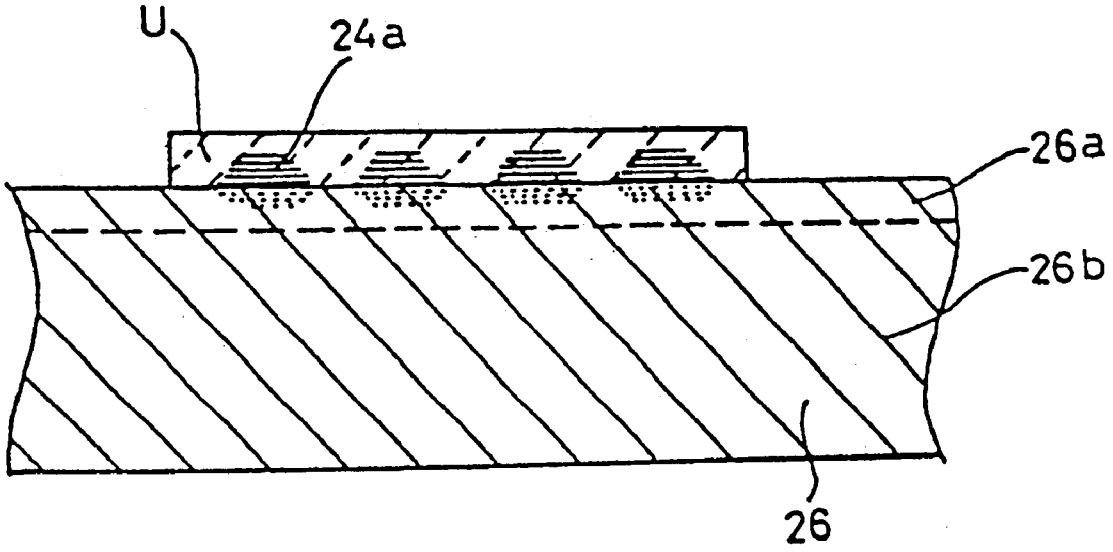

Thus, the ink pattern 24a is printed on the recording medium 26 as shown in FIG. 11.

It should be noted that the recording medium 26 comprises a base 26b and a printing ink acceptable layer 26a on the base 26b for being easily printed.

Accordingly, it is possible to obtain a high printing quality for the recording medium 26 having an uneven surface without being affected by the unevenness, since the ink pattern is thermally transferred onto the transparent material frame layer U transferred preliminary on the platen roller 25, then to the recording medium 26, together with the transparent material frame U, i.e. not directly on the uneven surface.

Figure 12:
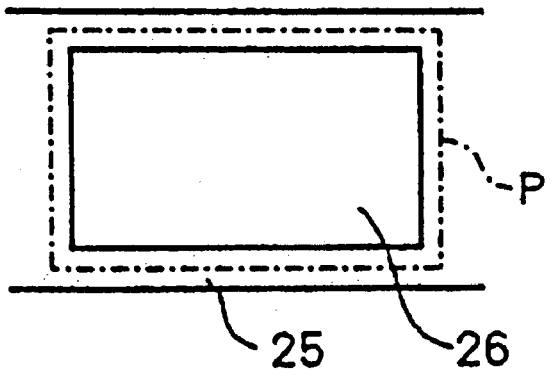
FIG. 12 is an explanatory view of the printing area.

As shown in FIG. 12, since it is possible to make the printing area P of the platen roller 25 equal to the area of the recording medium 26 or more than that, it is easy to print the ink pattern on a full area of the recording medium.

Further, in the prior art, an ink pattern printed on the recording medium with the sublimable ink in the thermal printing has to be overcoated subsequently with a protective transparent layer to prevent the sublimable ink pattern from sublimating. However, it should be noted that the method of the present invention requires no additional protective transparent layer because the layer of the transparent material 8*b* has a such function effect as a protection film.

What is claimed is:

1. A method for thermally transferring an ink pattern to a recording medium, comprising the steps of:

preparing an ink sheet provided with a hot-melt and/or hot-sublimable ink layer thereon and a transparent material sheet provided with transparent hot-melt material layer thereon;

thermally producing an ink pattern on said transparent hot-melt material layer of the transparent material sheet by heating said hot-melt and/or hot-sublimable ink layer with a thermal head; and thermally transferring the ink pattern produced on said transparent hot-melt material layer to the recording medium together with said transparent hot-melt material layer.

*2. A method for thermally transferring an ink pattern to a recording medium as defined in claim 1 wherein said step of thermally producing an ink pattern on said transparent hot-melt material layer of the transparent material sheet is further characterized in that the ink pattern so produced has a printing area larger than the area of said recording medium.*

* * * * *